(12) United States Patent
Ottenwälder et al.

(10) Patent No.: US 9,038,846 B2
(45) Date of Patent: May 26, 2015

(54) DEVICE FOR TEMPERING FOOD IN RECTANGULAR, PAN-LIKE CONTAINERS OF STANDARDIZED SIZES

(71) Applicant: BHS tabletop Aktiengesellschaft, Selb (DE)

(72) Inventors: Max Ottenwälder, Schwäbisch Gmünd (DE); Brigitte Johannes, Weiden (DE); Ralf Steiling, Weiden (DE); Manuela Küfner, Weiden (DE)

(73) Assignee: BHS TABLETOP AKTIENGESELLSCHAFT, Selb (DE)

( * ) Notice: Subject to any disclaimer, the term of this patent is extended or adjusted under 35 U.S.C. 154(b) by 30 days.

(21) Appl. No.: 13/826,823

(22) Filed: Mar. 14, 2013

(65) Prior Publication Data
US 2013/0292388 A1 Nov. 7, 2013

(30) Foreign Application Priority Data

Mar. 20, 2012 (DE) .......................... 10 2012 005 437

(51) Int. Cl.
*A47G 23/04* (2006.01)
*A47J 39/02* (2006.01)

(52) U.S. Cl.
CPC *A47G 23/04* (2013.01); *A47J 39/02* (2013.01)

(58) Field of Classification Search
CPC ........ A47J 39/02; A47J 39/006; A47G 23/04; B65D 81/3825; A47B 31/00; A47B 2031/003; A47B 57/10; A47B 57/30

USPC .......... 220/574.2, 574, 592.28, 23.87, 23.89; 217/17; 211/126.2, 126.3

See application file for complete search history.

(56) References Cited

U.S. PATENT DOCUMENTS

| | | | |
|---|---|---|---|
| 4,779,605 A | 10/1988 | Smith et al. | |
| 4,794,228 A | 12/1988 | Braun, Jr. | |
| 4,852,749 A | 8/1989 | Fernandez et al. | |

FOREIGN PATENT DOCUMENTS

| | | |
|---|---|---|
| DE | 299 10 565 U1 | 9/1999 |
| WO | 0076383 | 12/2000 |

*Primary Examiner* — Andrew Perreault
(74) *Attorney, Agent, or Firm* — Lucas & Mercanti, LLP; Klaus P. Stoffel (57) ABSTRACT

A device for tempering food held in rectangular pan-shaped containers of standardized sizes. The device has two opposing side walls and a cover panel connecting the side walls at the top. A rectangular opening is provided in the cover panel. The size of the opening is determined as a function of the standard-size containers to be placed in the opening. A laterally projecting opposite edges of the containers extend beyond the opening. Two opposing groove-like slots are on each of side walls below the opening. A tub for the purpose of tempering has two opposing, laterally projecting edges which are dimensioned to extend over the edges of the opening when the tub is placed in the opening, and which can be slid into the opposing slots in the side walls.

8 Claims, 9 Drawing Sheets

DEVICE FOR TEMPERING FOOD IN RECTANGULAR, PAN-LIKE CONTAINERS OF STANDARDIZED SIZES

CROSS-REFERENCE TO RELATED APPLICATIONS

This application claims the foreign priority of German Patent Application No. 10 2012 005 437.8, filed on Mar. 20, 2012, the disclosure of which is herein incorporated by reference in its entirety.

The invention pertains to a device for tempering food held in rectangular pan-shaped containers of standardized sizes.

In the field of gastronomy, it is often necessary to temper food for long periods, especially in the area of a buffet, where the guests can serve themselves over a long time. Depending on its type, the food may have to be kept warm or cold. As is sufficiently well known, pan-shaped containers, basically rectangular in shape, of standardized sizes, so-called "restaurant pans" (often also called GN pans), are used to present the food. These standard containers with their standardized sizes make it easy to swap out one container for another. The basic "Gastro-Norm" (Restaurant Standard) size is designated ¹⁄₁ and measures 325×530 mm; smaller and larger sizes are stated as fractions of the basic size. The depth of restaurant containers varies in the range of 20-200 mm, but these depths are also defined; that is, they, too, are standardized. Conventional depths are 20 mm, 65 mm, and 100 mm. The containers are usually used to present the food in a counter, underneath which a cooling element or a heating element is arranged, depending on whether the food is to be kept hot or cold.

When the containers are placed on a counter and containers of different depths are used, a nonuniform appearance results, even if the lengths and widths of the containers are the same. When these different containers are placed in a holding frame, in which they are supported by their edges, the distance between the containers and the cooling or heating element underneath, which always remains at the same height, will be different. When, therefore, a shallow container is used, there will be a considerable distance between it and the cooling or heating element; this means that the heating or cooling will be relatively inefficient. A very deep container, however, will be very close to the cooling or heating element, which results in a much stronger cooling or heating effect, which is also associated, however, with the possibility that the food might be heated or cooled too much.

The invention is therefore based on the problem of providing a device which makes it possible to improve the tempering of food held in restaurant containers.

To solve this problem with a device of the type described above, it is provided according to the invention that:
- a framework comprising at least two opposing side walls and a cover panel connecting the side walls at the top is provided;
- a rectangular opening is provided in the cover panel, the size of the opening being determined as a function of the standard-size containers to be placed in the opening, the laterally projecting opposite edges of which containers extend beyond the opening;
- at least two opposing groove-like slots on each of two insertion levels a certain vertical distance apart are provided in the side walls; and
- at least one tub for the purpose of tempering is provided, which comprises at least two opposing, laterally projecting edges, and which is dimensioned in such a way that, first, the edges of the tub extend over the edges of the opening when the tub is placed into the opening, and so that, second, the edges of the tub can be slid into the opposing slots in the side walls.

The inventive device is characterized, first, by a framework, which has at least two side walls, preferably also a rear wall closing off one of the other sides, and a cover panel, which comprises a large rectangular opening, into which the GN containers are to be placed. The dimensions of the opening are based on the lengths and widths of the GN containers which would be used in this context, namely, on the uniform, standardized dimensions of the basic size. This means that, because a GN container has a base area corresponding to the area or size of the opening, it will fit precisely in the opening, but it also means that two GN containers with half the width of the full-sized container can also be placed in the opening as well as three GN containers with one-third that width. The length of the containers, however, is always the same. It is also conceivable that the lengths of the containers could also vary so that, for example, two ²⁄₄-sized containers could also be placed in the opening.

The inventive device is also characterized by at least one tub, which can serve as a carrier for a cooling or heating means. This tub comprises two opposing, laterally projecting edges, by means of which it can be slid into corresponding slots, which are provided in the side walls and which define at least two insertion levels a certain vertical distance apart. This means that the tub can be positioned within the framework at a minimum of two different heights. The tub can also be set down in the opening, in which case its edges will extend over the edges of the opening. The GN containers can then be placed in the tub. There is thus also a third level available for positioning.

As mentioned above, the tub serves, for example, to hold a cooling element, which has a large surface area and when laid in the tub fills it up almost completely. Depending on how deep the container or containers which is or are to be placed in the opening, the tub will be positioned on the appropriate level. If, for example, shallow GN containers with a depth of 20 mm are being used, the tub will be dropped into the opening from above first, and after that will the GN containers be put in place. The cooling element is then at the optimum distance from the bottom of the containers.

When GN containers of greater depth, e.g., with a depth of 65 mm, are used, the tub will be slid into the upper insertion level, whereas the GN containers will now be placed directly in the opening. Here again, the cooling element is at the optimum distance from the bottom of the container. If even deeper GN containers are used, such as those with a depth of 100 mm, the tub will be slid into the lower insertion level, and the containers will be dropped into the opening from above. The cooling element will again be at the optimum distance from the bottom of the containers.

It is obvious that optimal tempering can be achieved as a result, wherein, of course, a heating element or heating means can be placed in this tub instead of a cooling element, or it could be mounted on the downward-facing side of the bottom to tub, as will be discussed again further below. In any case, the cooling or heating element can thus be installed in a position which is adapted to the depth of the GN containers and thus in the most effective position for the purpose of tempering.

Finally, more than two insertion levels defined by the groove-like slots can be provided in the framework. For example, three or more insertion levels can be provided, so that the tub described above can be positioned at an even larger number of different heights, so that GN containers of other depths can also be accommodated, or so that a completely different type of tub can be used, as will be described further below.

In an elaboration of the invention, the depth of the tub and the height of the insertion level are selected as a function of the standardized depths of the containers in such a way that the bottom of the tub, regardless of whether it is suspended in the opening or positioned on one of the insertion levels, will always be nearly the same distance from the bottom of the container assigned on the basis of its depth to this insertion level. This means that the depths of the tubs and the heights of the insertion levels are coordinated geometrically, so to speak, with the GN containers of the depths to be used, i.e., the containers for which the device has therefore been designed.

In an elaboration of the invention, the device can also comprise at least one additional tub to hold water, which serves to heat the food; this tub comprises at least two opposing, laterally projecting edges, and is dimensioned in such a way that its edges extend over the edges of the opening and thus support the tub in the opening. This special tub serves only to heat food, for which purpose it holds water, which is heated from below. A tub of this type is also called a "chafing dish". The tub itself is first dropped into the opening from above, but, compared with the previously described tubs, it is deeper, so that it extends relatively far down into the interior of the framework. A GN container of defined depth, e.g., with a depth of 65 mm, can now be dropped into this tub and again will be a defined distance from the bottom of the tub.

At this point it should be pointed out that there is no need for such a special tub to heat food, for the previously described tubs are also capable in principle of holding a heating means; that is, that they, too, can be filled with water and possibly heated from below. It would also be possible to install a cooling element in them.

But if one of these special additional tubs or "chafing dishes" is used, it will usually be placed into the opening from above. It is also conceivable, however, that the edges of the tub could be designed so that the tub can also be installed on at least one of the insertion levels. This means that the tub can be installed not only in the first, uppermost level, but also in one of the lower insertion levels defined by the slots. This makes it possible, for example, for GN containers with a depth of 100 mm to be used in conjunction with this special tub. Nevertheless, these 100-mm-deep GN containers can also be used with a tub of the first type, which will then be installed in, for example, the second, lowermost insertion level. The distance to the bottom of the tub will be essentially the same here as to the bottom of the special additional tub.

As described above, this additional tub serves primarily for heating. So that the water it holds can be tempered continuously, it is effective to provide a possibly tub-like support plate with at least two opposing lateral edges, which can be inserted into the slots of an insertion level, this plate serving to accept one or more heating elements, especially one or more burners such as gel burners. This support plate therefore forms the positioning plane for a heating element, which heats the additional tub from underneath. Obviously this support plate can also be used in conjunction with a tub of the first type in cases where water is added to it to heat the food. The support plate can then be arranged in a corresponding manner underneath this tub, so that a heating element resting on it can heat the water in the tub located above it.

According to an especially effective elaboration of the invention, a mounting for at least one heating element, especially an electric hot plate or a burner box, is provided on the downward-facing side of the bottom of the tub, regardless of what kind of tub it is. According to this embodiment of the invention, it is therefore possible, if desired, to install a heating element directly underneath the tub on the tub itself. A heating element mounting of this type can serve both on the tub of the first type, which usually serves to hold a cooling element but can also serve the purpose of heating hot water, and it can also be provided on the additional tub, which serves primarily as a heating tub. The mounting can be, for example, in the form of two opposing angle pieces, into which a heating element, such as a resistance-heated hot plate, is inserted.

The tubs and support plates are preferably made of metal, especially of stainless steel or plastic, so that they are sufficiently sturdy but also easy to clean.

The framework can be made of various materials; the use of wood, for example, is conceivable, especially coated wood (e.g., with a melamine coating which meets fire safety regulations), but designs of plastic or metal, especially stainless steel, are also possible.

In addition to the device, the invention also pertains to an installation for the presentation and simultaneous tempering of food, comprising a device of the type described above consisting of the framework, the tub(s) or support plate, and at least one standardized rectangular container, which serves to hold the food. This means that the installation also comprises the GN container or usually several GN containers, so that overall a complete presentation and tempering system is obtained, consisting of framework, tubs/support plate, and GN containers.

As described, several containers of different but standardized sizes are advisably provided, which are of different widths but all of the same defined length, wherein the length corresponds to one of the dimensions of the receiving opening, whereas the width corresponds either to the other dimension of the opening or to a standardized fraction thereof. Containers are advisably provided in three different sizes, wherein a container of the first size is dimensioned so that it fills the entire opening by itself; a container of the second size is dimensioned so that two such containers can be placed in the opening, which they then completely fill; and a container of the third size is dimensioned so that three such containers can be placed in the opening, which they then completely fill. If the division is made in the other plane, i.e., the one perpendicular to this one, it is then the dimension of this other plane which remains constant. It would then be possible, for example, to provide one large container, which fills the entire opening as usual, and two additional containers of size ⅔, which can be placed together in the opening, which they then completely fill. In this case, only two different sizes, each of a different depth, are provided. The containers themselves can comprise three different standardized depths, such as 20 mm, 65 mm, and 100 mm, and the design of the tubs and the positioning of the insertion levels will obviously implemented in corresponding fashion. The containers themselves are preferably made of porcelain, but they could also be made of metal or plastic.

Additional advantages, features, and details of the invention can be derived from the exemplary embodiment described below and from the drawings.

Figure 1:
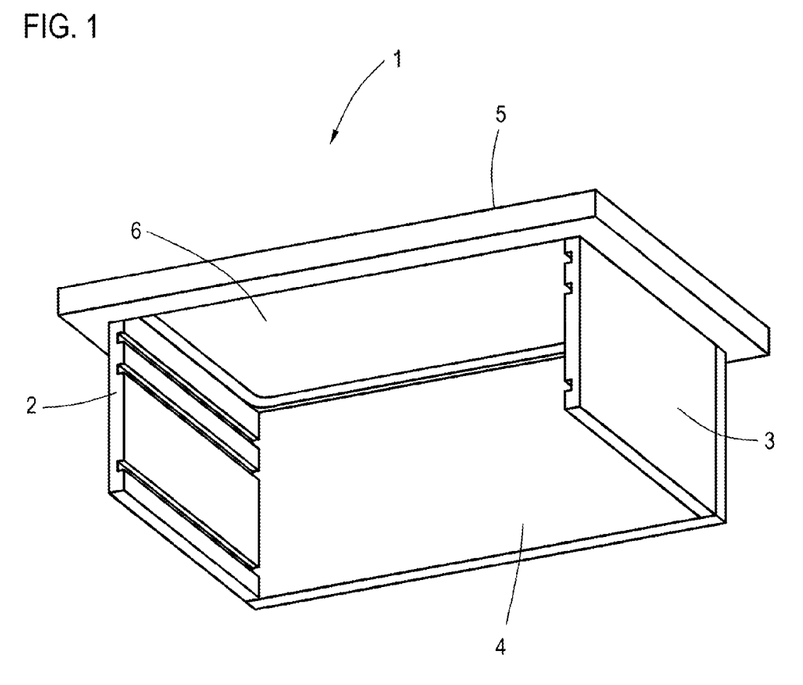
FIG. 1 shows a perspective view of a framework of an inventive installation, seen at an angle from below.
Figure 4:
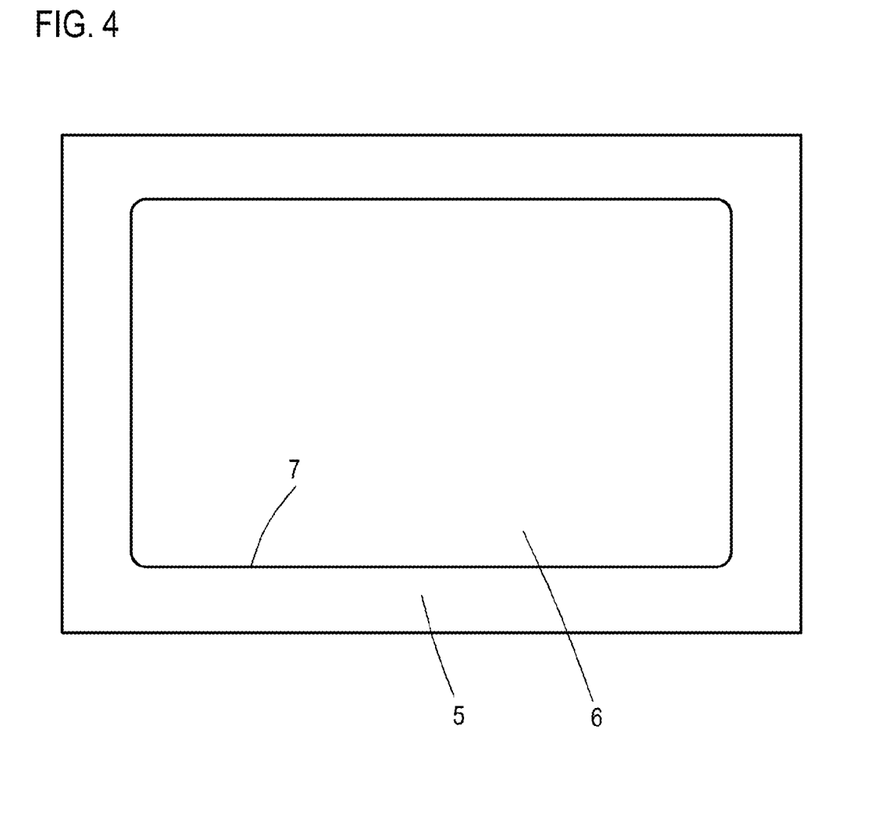
FIG. 4 shows a top view of the framework of FIG. 1.

FIG. 1 shows the framework 1 of an inventive device, comprising two side walls 2, 3 and a front wall 4 connecting the two sides. The framework 3 is open at the rear to allow the insertion of tubs, which will be discussed again later. On the top a cover panel 5 is provided, which comprises a central opening, which is rectangular (see FIG. 4). The edges 7 surrounding the opening serves to support the edge sections of GN containers to be dropped in, as will be discussed again later.

Figure 2:
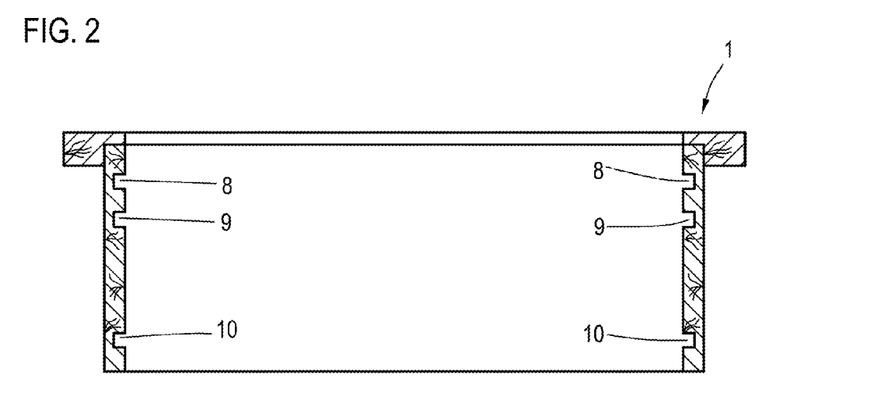
FIG. 2 shows a longitudinal cross section through the framework of FIG. 1.
Figure 3:
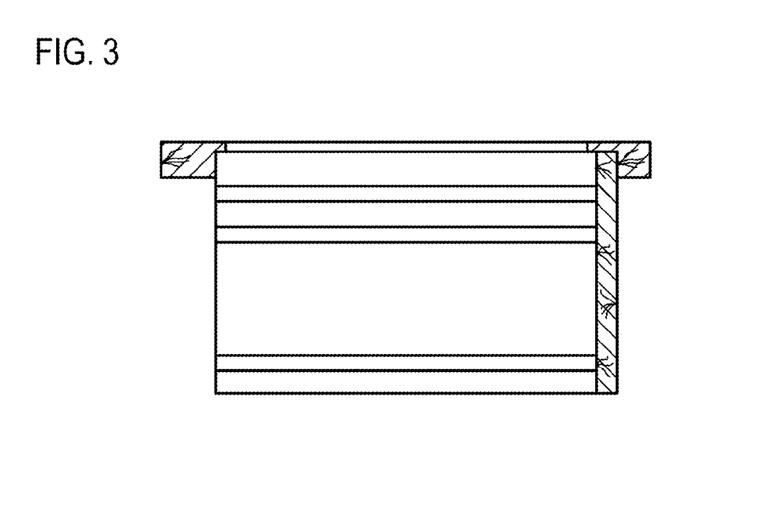
FIG. 3 shows a transverse cross section through the framework of FIG. 1.

Pairs of opposing slots 8, 9, 10 are introduced into the two side walls 2, 3; see especially the cross-sectional view in FIG. 2. Each pair of slots 8, 9, 10 defines an insertion level for tubs, which can thus be positioned at various heights.

The framework 1 itself is preferably made of wood and preferably provided with a plastic coating such as a coating of melamine. Other materials are also possible. The framework 1, which can also be called a sideboard, thus serves as a frame or holder for various GN containers, the surface areas of which are standardized. The depths of the containers are also standardized to dimensions of for example, 20 mm, 65 mm, or 100 mm. This means that the GN containers being used extend down to different degrees into the interior of the framework. So that a cooling element or a heating element can be positioned optimally with respect to the container bottom, the arrangement of the pairs of slots 8, 9, 10 allows a corresponding tub to be installed in the appropriate position in the inventive framework.

FIGS. 5-10 show various application examples. Each one illustrates a cross-sectional view from the rear.

Figure 5:
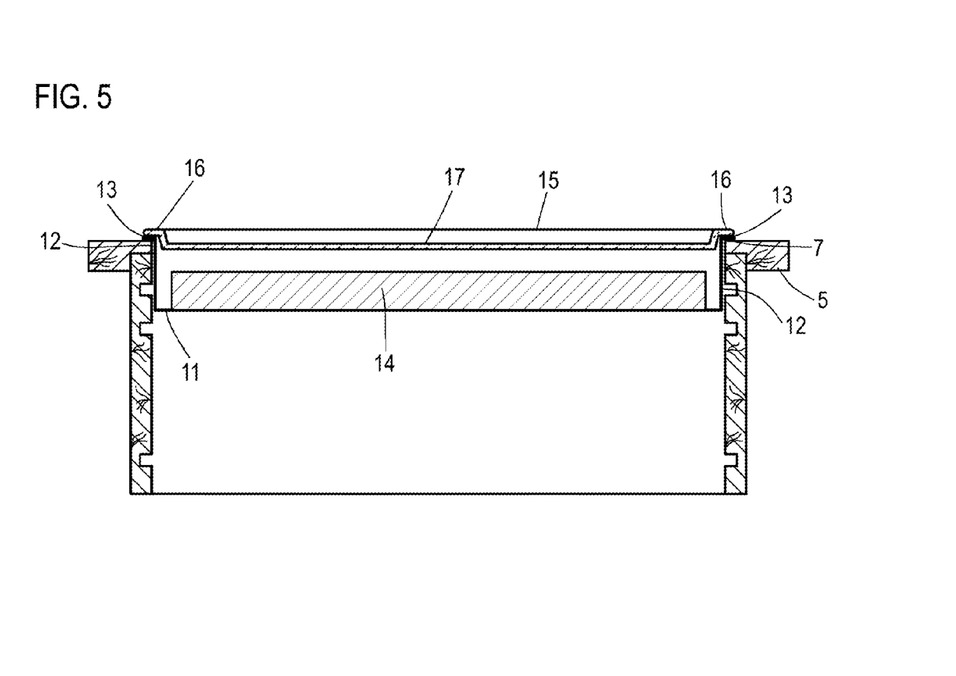
FIG. 5 shows a first arrangement example of an inventive device with a first tub.

FIG. 5 shows a first exemplary embodiment. In this example, a tub 11, which comprises an edge 13, bent sideways toward the outside, on each of its two opposing side walls 12, has been dropped into the opening in the cover panel 5. These two edges of the tub 11 rest on the edges 7 of the opening. The tub 11 is preferably also closed on both of the long sides, so that it thus forms a closed interior space. For the sake of clarity, however, these two side walls are not shown in themselves.

In the example shown here, a cooling element 14 such as a cooling plate, which has previously been chilled to the desired temperature in a refrigerator or freezer, has been placed in the interior of the tub.

It is also possible to see a first GN container 15, which has been dropped into the opening in the cover panel 5; it rests by its edges 16 on the edges 13 of the tub; here again, only the two side edges are shown. There is only a relatively short distance between the bottom 17 of the container and the cooling element 14. The distance is calculated in such a way that a certain air cushion is provided to optimize the cooling. In the example shown here, the GN container 15 has a depth of 20 mm by way of example.

Figure 6:
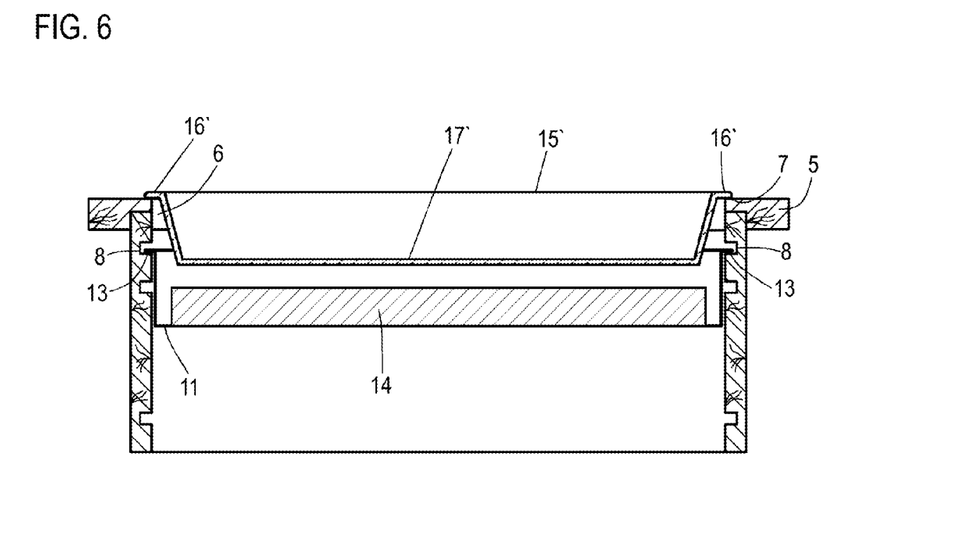
FIG. 6 shows a second arrangement example.

FIG. 6 shows an application example in which the same tub 11 is used, but here it is arranged on the insertion level formed by the two groove-like slots 8. For this purpose, the two edges 13 of the tub 11 are slid into the two slots 8, which is easy to do because the framework 1 is open at the rear (see FIG. 1). A second GN container 15', which is deeper than the first GN container 15 shown in FIG. 1, i.e., which has a depth of, for example, 65 mm, is supported by its two side edges 16' in the opening 6; the two side edges 16' thus rest on the edges 7 of the opening.

As can be seen, a small but defined gap is again formed between the container bottom 17' and the cooling element 14, which is again placed in the tub 11. The gap is essentially the same as that according to the application example of FIG. 5.

Figure 7:
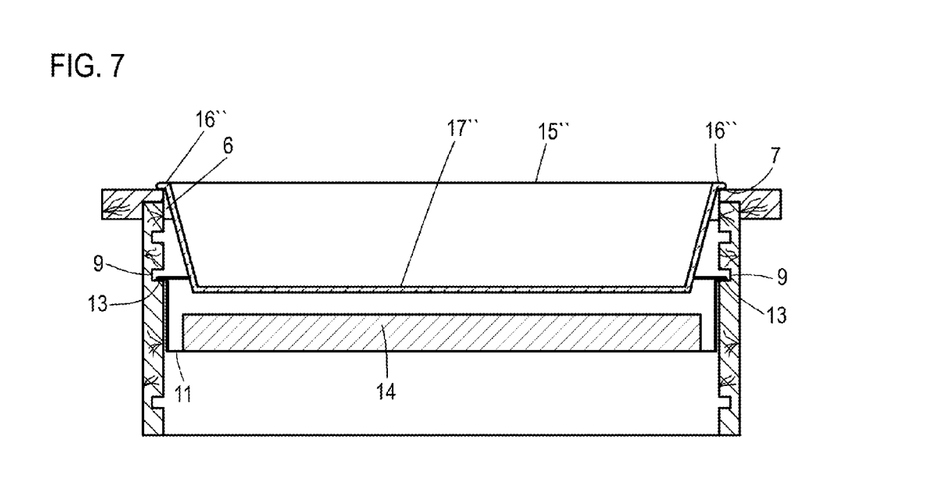
FIG. 7 shows a third arrangement example.

A third application example using the same tub 11 is shown in FIG. 7. Here the tub 11 is supported by its edges 13 on the insertion level defined by the two groove-like slots 9, the edges 13 of the tub being slid into the slots 9. The GN container 15" used here is one standard size larger; it comprises, for example, a depth of 100 mm and also rests by its two side edges 16" on the edges 7 of the opening. It extends through the opening 6 to a considerable depth into the interior of the framework; its bottom 17" lies here, too, a defined distance away from the cooling element 14 placed in the tub, wherein again the gap is almost the same as that in the previously described application example. An air cushion is again formed between the bottom 17" of the container and the cooling element 14.

Figure 8:
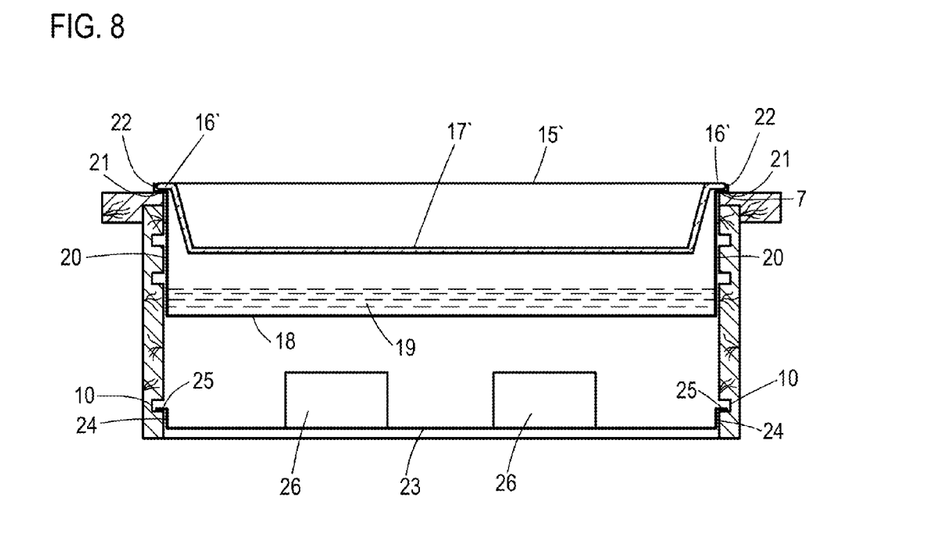
FIG. 8 shows a fourth arrangement example with an additional tub and a support plate.

FIG. 8 shows an application example in which an additional tub 18 is used. This additional tub, which can also be called a "chafing dish", serves to hold water 19. It therefore forms a water bath, which . . . the heating of the food held in the GN container 15' to be used here.

This tub 18 also comprises two side walls 20 and also, of course, a front wall and a rear wall. The tub is therefore closed, although this is not shown in the drawing of FIG. 8. The two side walls 20 are provided in their edge area with bent-over, outward-pointing edges 21, which are then bent again to form the sections 22. The tub 18 lies by these lateral edges 21 on the edges 7 of the opening. The GN container 15' (corresponding to the container in FIG. 6) rests by its container edges 16' on the edges 22 of the tub.

Underneath the tub 18 is a support plate 23, which, in the example shown, comprises only two side walls 24 with corresponding edges 25, which, in the example shown, fit in the groove-like slots 10 defining the lowermost insertion level. The support plate 23 serves to hold two heating elements 26 such as two gel burners, by which the tub 18 can be heated from underneath, so that the water 19, i.e., the water bath, can be tempered. The support plate 23, which can be, for example, a metal GN plate of size ⅓ with a standard commercial depth of 20 mm, can obviously also be closed along the two other side walls and therefore also designed as a tub-like container.

Figure 9:
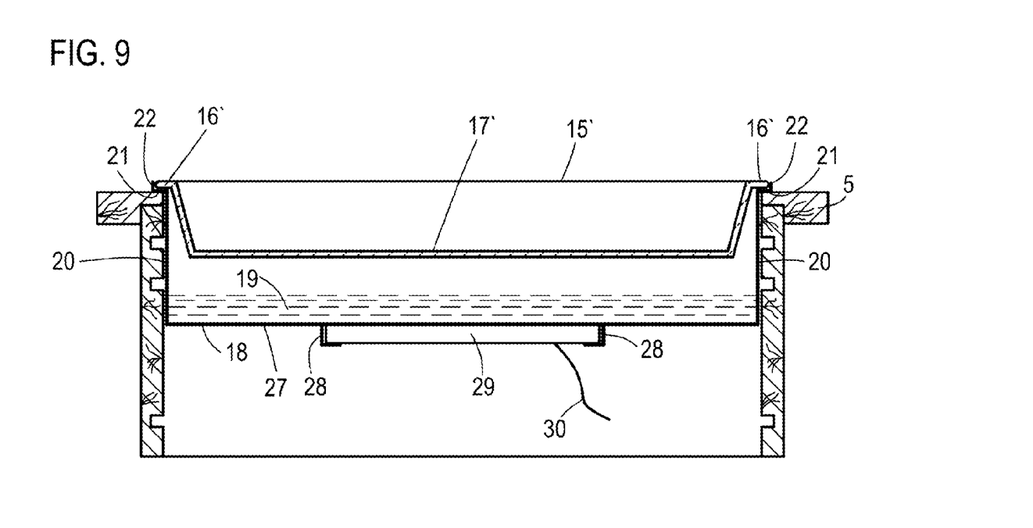
FIG. 9 shows a fifth arrangement example of an additional tub.

FIG. 9 shows a design similar to that of FIG. 8. Here, too, a tub 18 is used, which serves to hold a water bath 19 and which is supported on the cover panel 5 by its edges 21 provided on the side walls 20. Dropped into it in turn is a GN container 15', which is supported by its edges 16' on the edges 21 of the tub.

Here, however, two brackets 28, which form a mounting for an electric hot plate 29, are provided on the bottom 27 of the tub 18. Such a hot plate can be used to heat the bottom directly. The cable 30 can be guided out through the open rear of the framework and connected.

Figure 10:
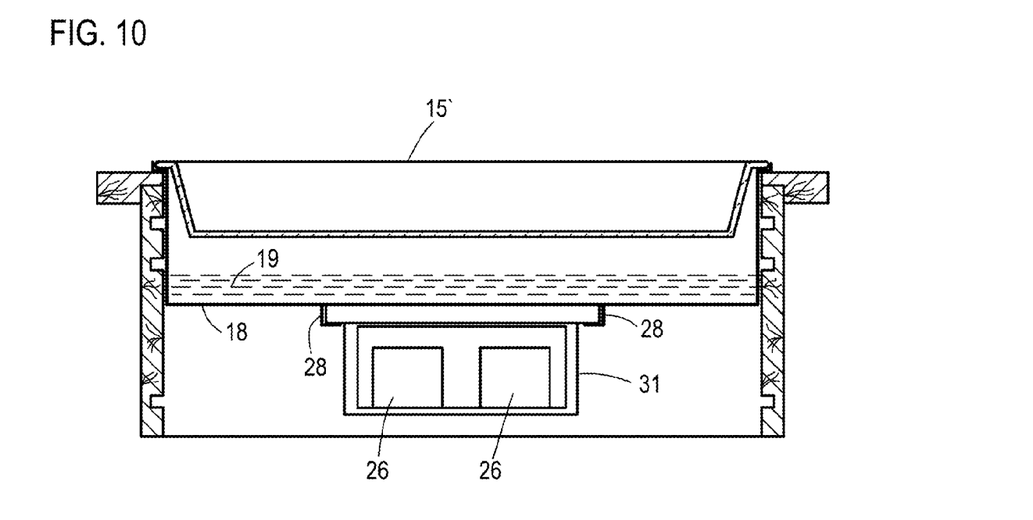
FIG. 10 shows a sixth arrangement example of an additional tub.

Instead of the electric hot plate 29, it is also possible to install a burner box 31 in the brackets 28 (see FIG. 10). In the example shown, two gel burners 26 can be provided; these, too, can be used to heat the bottom directly.

In the exemplary embodiment of a tub 18 shown here according to FIGS. 8-10, in which an additional, vertically upward-projecting edges 22 are provided on the edges 21 of the tub, it is not possible to slide the edges 21 of the tub into a pair of slots 8 or 9. If, however, the vertically projecting edges 22 are not provided or a shortened version of them is provided, it is obviously also possible that this tub 18 could, for example, be slid into the upper insertion level, formed by the slots 8, in which case the tub would therefore be positioned somewhat lower down. It would then obviously also be easy to use, for example, a GN container 15" with a depth of 100 mm.

In the case of the tubs 11 according to FIGS. 5-7, furthermore, it is also possible to arrange brackets 28 on the bottom side to form a mounting, so that, as needed, an electric hot plate 29 or a burner box 31 can be attached to these tubs as well. For obviously a tub 11 can also be used equally well as a water bath after its sides have been closed preferably all the way around. This then demands, however, that these tubs be made of metal, preferably stainless steel, which also applies in principle to the tubs 18. Insofar as the tubs 11, however, are not used for heating but rather merely to hold a cooling element, they can also be made of plastic.

FIGS. 11-16, finally, show side views looking at the open rear of the framework and a top view of three different arrangement examples of GN containers. In these examples, GN containers 15' with a standardized depth of 65 mm are used.

Figure 11:
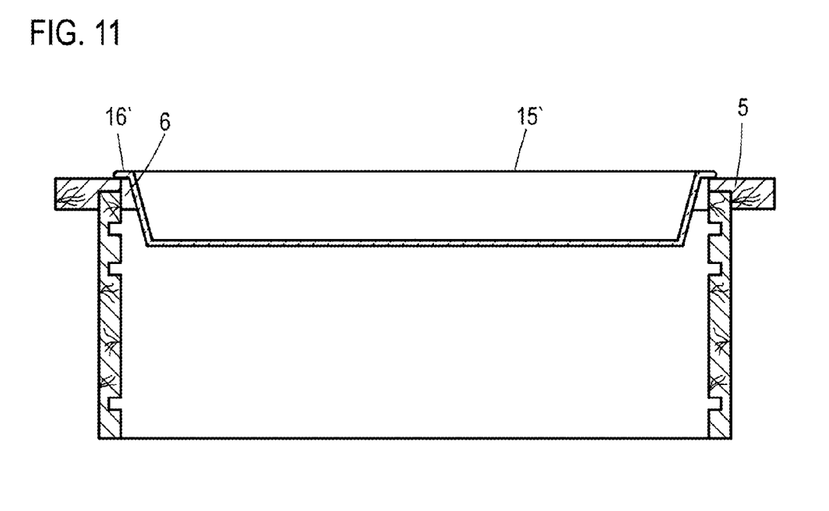
FIGS. 11-17 show various side views and top views of the inventive device with integrated GN containers.
Figure 12:
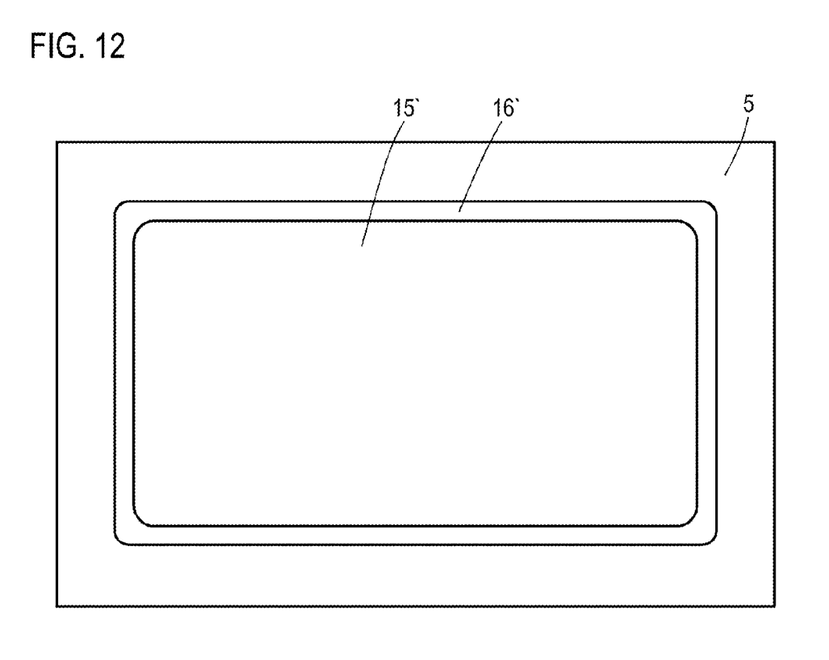

In the application example according to FIGS. 11 and 12, only one GN container 15' is set into the opening 6. The size of the GN container 15' corresponds with respect to its length and width to the length and width of the opening 6 and therefore fills the entire opening. It can be seen that all of the side edges 16' extending around the container 15' rest on the cover panel 5.

Figure 13:
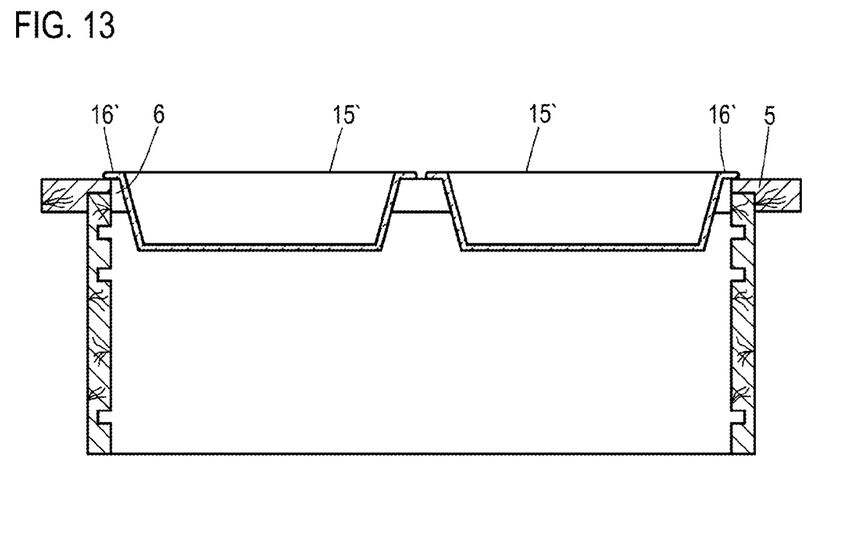
Figure 14:
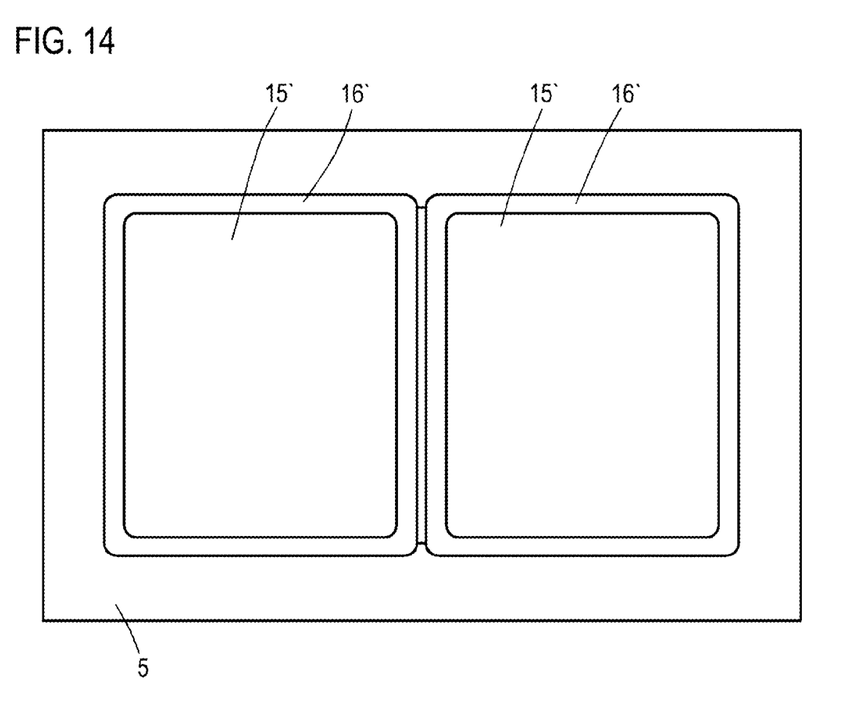

In the example shown according to FIGS. 13 and 14, two GN containers 15' have been placed in the opening 6. The length of two containers 15' corresponds to the dimension of the one container 15' from FIGS. 11 and 12 but only to half the width of the container 15' of FIGS. 11 and 12. It can be seen that two such GN containers 15' are arranged in the opening 6 and fill it completely; three side edges 16' of each container rest on the cover panel 5, whereas the two side edges in the middle are unsupported.

Figure 15:
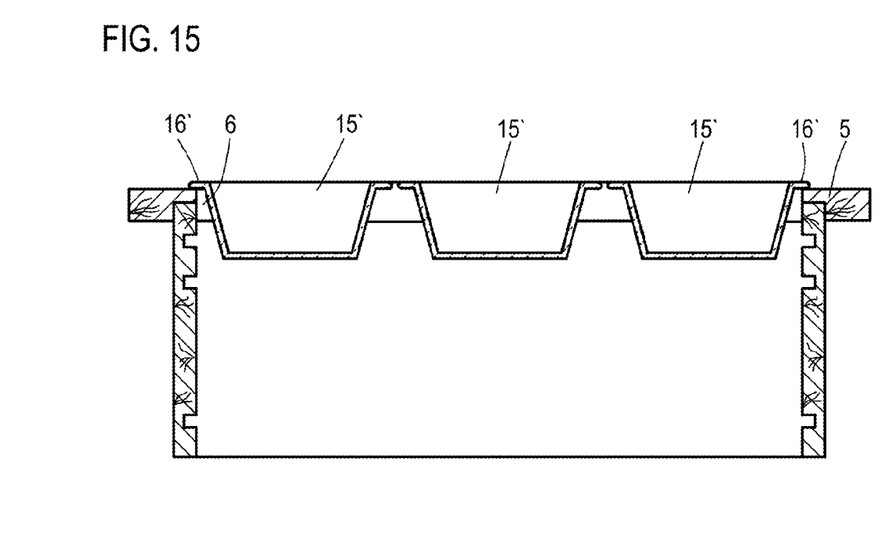
Figure 16:
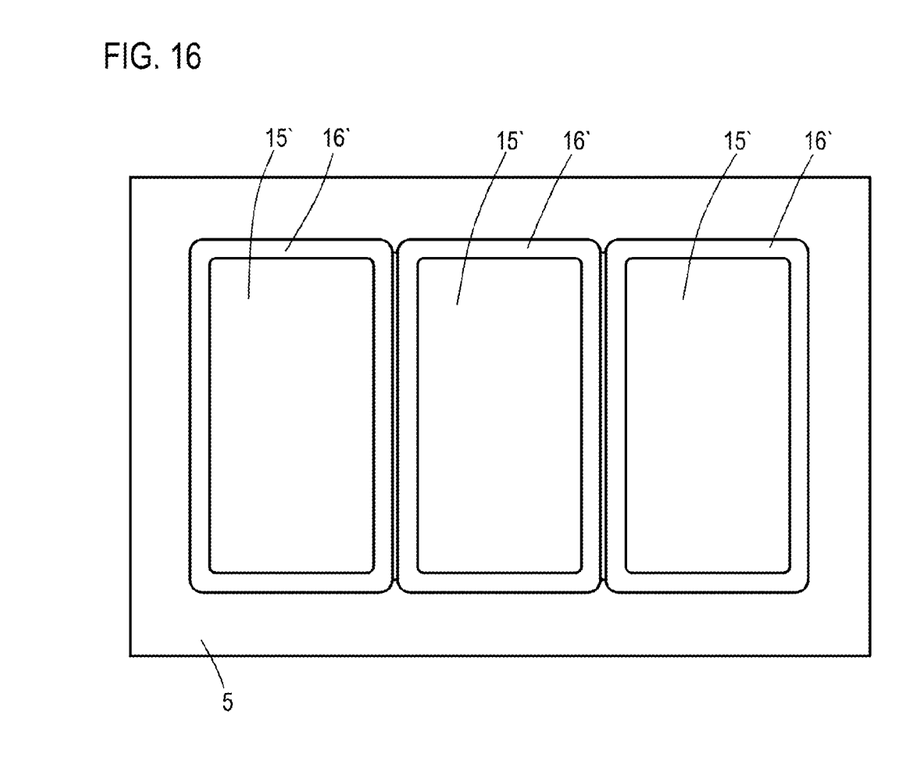

FIGS. 15 and 16 show an exemplary embodiment in which three GN containers 15' are used, the length of which corresponds to the length of the containers shown in FIGS. 11-14. The width of each container 15' according to FIGS. 15 and 16, however, corresponds to only one-third of the width of one of the containers 15' from FIGS. 11 and 12. It can therefore be seen that, as a result, three such containers are positioned in the opening 6, wherein the outer containers 15' are supported by three of their side edges 16', whereas the inner container 15' is supported by only two side edges.

Figure 17:
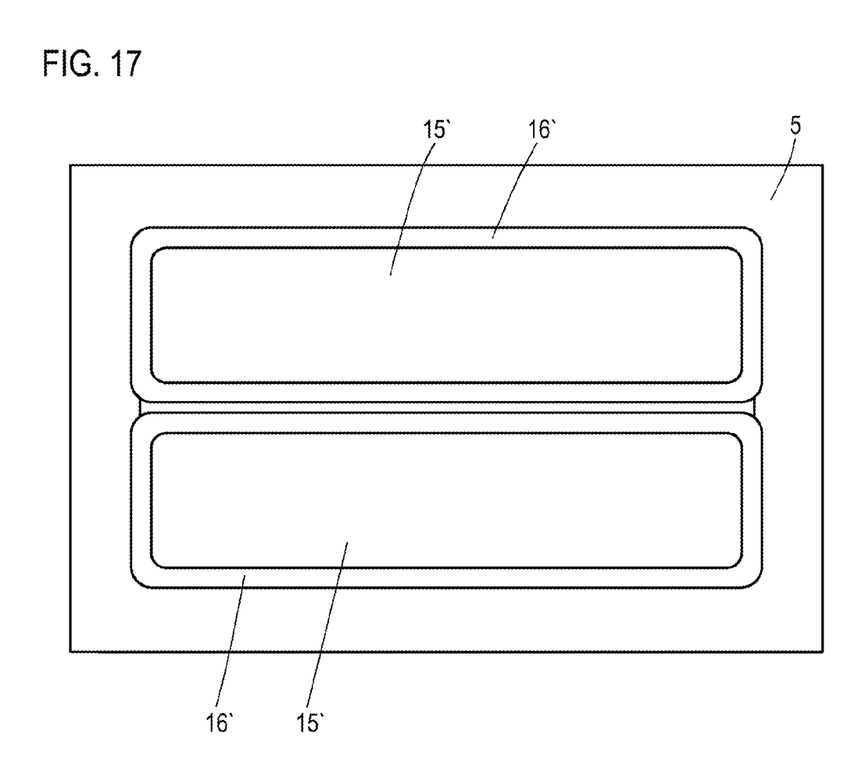

FIG. 17, finally, shows an exemplary embodiment with two ⅔-sized containers 15', which are placed together in the opening in place of one large container as shown, for example, in FIGS. 11 and 12, and thus fill up the entire opening. Here, therefore, the "parting plane" passes between the containers in the vertical direction compared to the "parting plane" of the previously described examples.

The invention claimed is:

1. A device for tempering food held in rectangular pan-shaped containers of standardized sizes, the device comprising:
    a framework comprising at least first and second opposing side walls separated by a first width, the first and second opposing sidewalls comprising first and second pairs of opposing slots at first and second insertion levels separated by a vertical distance, wherein each pair of opposing slots comprises a pair of cavities in the first and second opposing sidewalls;
    a cover panel connecting first and second tops of the first and second side walls, wherein the cover panel comprises a rectangular opening having the first width selected to accommodate a standard-size container placed in the opening, wherein the container has a second width between first and second opposing edges of the container, the second width of the container being larger than the first width of the opening such that the first and second opposing edges of the container hold the container in the opening; and
    a tub having a third width between third and fourth opposing edges, the third width being larger than the first width of the opening, wherein the third and fourth opposing edges of the tub hold the tub in the opening when the tub is placed in the opening, wherein the third and fourth opposing edges of the tub can be slid into a selected one of the first and second pairs of opposing slots located in the first and second side walls.

2. The device according to claim 1, wherein the first and second side walls further comprise a third pair of opposing slots, at a third insertion level the third insertion level separated by a vertical distance from the first and second insertion levels.

3. The device according to claim 1, wherein the tub has a bottom and a depth, wherein the depth of the tub and position of the insertion level are selected based on one or more standardized container depths in such a way that, regardless of whether the tub is supported within the opening or is positioned at a selected one of the insertion levels, the bottom of the tub is separated from a bottom of the container by a predetermined distance.

4. The device according to claim 1, wherein a downward facing surface of a bottom of the tub comprises at least one mounting for at least one heating element.

5. The device according to claim 1, wherein the tub comprises one of metal and plastic.

6. The device according to claim 1, wherein the framework comprises one of wood, plastic, and metal.

7. The device according to claim 1, further comprising a standardized rectangular container adapted to hold the food.

8. The device according to claim 7, wherein the at least one standardized rectangular container comprises one of porcelain, metal, and plastic.

* * * * *